United States Patent [19]

Sivavec

[11] Patent Number: 4,808,671

[45] Date of Patent: Feb. 28, 1989

[54] CATALYTIC METHOD OF PREPARING CARBOXY DERIVATIVES OF POLYPHENYLENE ETHERS

[75] Inventor: Timothy M. Sivavec, Clifton Park, N.Y.

[73] Assignee: General Electric Company, Schenectady, N.Y.

[21] Appl. No.: 184,328

[22] Filed: Apr. 21, 1988

[51] Int. Cl.[4] ............................................... C08G 65/48
[52] U.S. Cl. .................................. 525/397; 528/212; 528/214
[58] Field of Search ................. 525/397; 528/212, 214

[56] References Cited

U.S. PATENT DOCUMENTS

| | | | |
|---|---|---|---|
| 4,642,358 | 2/1987 | Aycock et al. | 549/245 |
| 4,654,405 | 3/1987 | Jalbert et al. | 525/397 |
| 4,760,118 | 7/1988 | White et al. | 525/397 |

Primary Examiner—Harold D. Anderson
Attorney, Agent, or Firm—William H. Pittman; James C. Davis, Jr.; James Magee, Jr.

[57] ABSTRACT

Carboxylated polyphenylene ethers are prepared by reaction of the polyphenylene ether with an ester such as a 4-alkyl or 4-aryl ester of trimellitic anhydride. The methyl, ethyl and o-carbophenoxyphenyl esters are preferred; the latter caps the polyphenylene ether in addition to carboxylating it. The reaction takes place in the presence of a triaryl phosphite, at a temperature in the range of about 225°–350° C.

19 Claims, No Drawings

CATALYTIC METHOD OF PREPARING CARBOXY DERIVATIVES OF POLYPHENYLENE ETHERS

This invention relates to the preparation of carboxylated polyphenylene ethers, and more particularly to a method of preparation thereof which may be conducted in the melt.

The polyphenylene ethers are a well known class of polymers, characterized by a unique combination of chemical, physical and electrical properties over a temperature range of more than 350° C., extending from a brittle point of about −170° C. to a heat distortion temperature of about 190° C. This combination of properties renders them suitable for use as engineering thermoplastics in a broad range of applications which are well known in the art and are disclosed in numerous patents and other publications.

In recent years, there has been considerable interest in combining polyphenylene ethers with other resins to produce compositions with even more advantageous properties. For example, such polymers as linear polyesters and polyamides are frequently noted for their solvent resistance, and blends of such polymers with polyphenylene ethers might be expected to possess the advantageous properties of the latter and in addition be highly resistant to solvents. However, simple blends of polyphenylene ethers and polyamides or polyesters are generally incompatible, frequently undergoing phase separation and delamination. They typically contain large, incompletely dispersed polyphenylene ether particles and no phase interaction between the two resin phases.

A successful approach to compatibilization of polyphenylene ethers with polyesters, polyamides and the like involves functionalization of the polyphenylene ether by reaction with a molecule containing epoxy, carboxylic acid or other reactive groups. Said groups can then undergo reaction with the polyester or polyamide to form a copolymer. In addition to being inherently stable, such copolymers serve as compatibilizers for blends of unfunctionalized polyphenylene ether with polyamide or polyester, thus improving such properties as impact strength and tensile strength.

U.S. Pat. No. 4,642,358 describes the reaction of polyphenylene ethers with such polycarboxylic reactants as trimellitic anhydride acid chloride (TAAC). The product is useful as a compatibilizer for polyphenylene ether-polyamide blends, as disclosed and claimed in U.S. Pat. No. 4,600,741. It is also useful for the preparation of compatible blends of polyphenylene ethers with polyesters, as disclosed in PCT application No. 87/7279 and copending, commonly owned application Ser. No. 122,480, filed Nov. 10, 1987. The disclosures of these patents and applications are incorporated by reference herein.

A disadvantage of the reaction of polyphenylene ethers with TAAC is that it must be conducted in solution, typically in an organic solvent such as toluene. Polyphenylene ethers are often melt processed rather than solution processed, in which case the requirement of solution functionalization is undesirable. Moreover, the products prepared by this method frequently coagulate, contain large proportions of fines and have substantial chloride content. All of these conditions may be disadvantageous for many utilities of the resulting blends.

The present invention provides a method for preparing carboxy derivatives of polyphenylene ethers which may be conducted in the melt rather than requiring solution conditions. It produces, in high yield, carboxylated polyphenylene ethers identical to those obtained by the solution reaction with TAAC and similar reagents. Moreover, it may be adapted to cap unfunctionalized polyphenylene ether, thus improving its stability.

The invention is a method for preparing a carboxy derivative of a polyphenylene ether which comprises contacting said polyphenylene ether at a temperature in the range of about 225°–350° C. with at least one ester of the formula

wherein $R^1$ is an alkyl or fluoroalkyl radical containing about 1–6 carbon atoms or an unsubstituted or substituted aryl radical containing about 6–10 carbon atoms and $R^2$ is an organic radical containing at least one additional carboxylic acid ester or anhydride group, in the presence of a catalytic amount of at least one triaryl phosphite.

The polyphenylene ethers to which the present invention is applicable are a well known class of polymers. They are widely used in industry, especially as engineering plastics in applications requiring toughness and heat resistance. Since their discovery, they have given rise to numerous variations and modifications all of which may be employed in the invention, including but not limited to those described hereinafter.

The polyphenylene ethers comprise a plurality of structural units having the formula

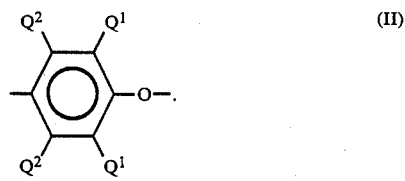

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q^1$ is alkyl or phenyl, especially $C_{1-4}$ alkyl, and each $Q^2$ is hydrogen. Suitable polyphenylene ethers are disclosed in a large number of patents.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6- trimethyl-1,4-phenylene ether units. Many suitable random copolymers, as well as homopolymers, are disclosed in the patent literature.

Also included are polyphenylene ethers containing moieties which modify properties such as molecular weight, melt viscosity and/or impact strength. Such polymers are described in the patent literature and may be prepared by grafting onto the polyphenylene ether in known manner such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000 and a weight average molecular weight within the range of about 20,000–80,000, as determined by gel permeation chromatography. Its intrinsic viscosity is most often in the range of about 0.35–0.6 dl./g., as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-di-methyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and μ-diketones. Also useful are known cobalt-containing catalyst systems. Suitable manganese and cobalt-containing catalyst systems for polyphenylene ether preparation are known in the art by reason of disclosure in numerous patents and publications.

Particularly useful polyphenylene ethers for the purposes of this invention are those which comprise molecules having at least one of the end groups of the formulas

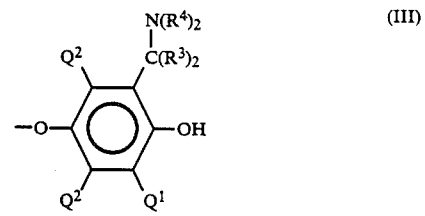

and

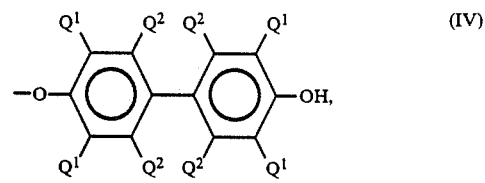

wherein $Q^1$ and $Q^2$ are as previously define; each $R^3$ is independently hydrogen or alkyl, with the proviso that the total number of carbon atoms in both $R^3$ radicals is 6 or less; and each $R^4$ is independently hydrogen or a $C_{1-6}$ primary alkyl radical. Preferably, each $R^3$ is hydrogen and each $R^4$ is alkyl, especially methyl or n-butyl.

Polymers containing the aminoalkyl-substituted end groups of formula III may be obtained by incorporating an appropriate primary or secondary monoamine as one of the constituents of the oxidative coupling reaction mixture, especially when a copper- or manganese-containing catalyst is used. Such amines, especially the dialkylamines and preferably di-n-butylamine and dimethylamine, frequently become chemically bound to the polyphenylene ether, most often by replacing one of the α-hydrogen atoms on one or more $Q^1$ radicals. The principal site of reaction is the $Q^1$ radical adjacent to the hydroxy group on the terminal unit of the polymer chain. During further processing and/or blending, the aminoalkyl-substituted end groups may undergo various reactions, probably involving a quinone methide-type intermediate of the formula

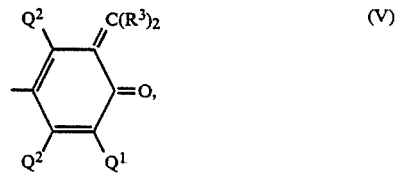

with numerous beneficial effects often including an increase in impact strength and compatibilization with other blend components. Reference is made to U.S. Pat. Nos. 4,054,553, 4,092,294, 4,477,649, 4,477,651 and 4,517,341, the disclosures of which are incorporated by reference herein.

Polymers with 4-hydroxybiphenyl end groups of formula IV are typically obtained from reaction mixtures in which a by-product diphenoquinone of the formula

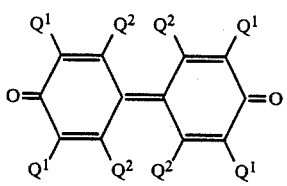 (VI)

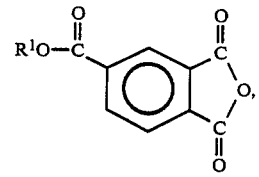 (VII)

is present, especially in a copper-halide-secondary or tertiary amine system. In this regard, the disclosure of U.S. Pat. No. 4,477,649 is again pertinent as are those of U.S. Pat. Nos. 4,234,706 and 4,482,697, which are also incorporated by reference herein. In mixtures of this type, the diphenoquinone is ultimately incorporated into the polymer in substantial proportions, largely as an end group.

In many polyphenylene ethers obtained under the above-described conditions, a substantial proportion of the polymer molecules, typically constituting as much as about 90% by weight of the polymer, contain end groups having one or frequently both of formulas III and IV. It should be understood, however, that other end groups may be present and that the invention in its broadest sense may not be dependent on the molecular structures of the polyphenylene ether end groups.

It will be apparent to those skilled in the art from the foregoing that the polyphenylene ethers contemplated for use in the present invention include all those presently known, irrespective of variations in structural units or ancillary chemical features.

The present invention requires contact under reactive conditions between the polyphenylene ether and at least one ester having formula I. In that formula, the $R^1$ value may be a $C_{1-6}$ alkyl or fluoroalkyl or unsubstituted or substituted $C_{6-10}$ aryl radical. Illustrative alkyl radicals are methyl, ethyl, 1-propyl, 2-propyl, n-butyl, isobutyl, t-butyl, amyl, isoamyl and corresponding hexyl, octyl, nonyl and decyl radicals. Corresponding fluoroalkyl groups, especially trifluoromethyl, are also useful. Illustrative aryl radicals are phenyl, p-nitrophenyl, o-carbomethoxyphenyl, o-carbophenoxyphenyl and p-acetylphenyl. Aryl groups containing one or more electron-withdrawing substituents and alkyl groups are preferred. $o$-Carbophenoxyphenyl groups are especially useful when simultaneous capping and carboxylation are desired.

The $R^2$ value may be an aliphatic, alicyclic or aromatic radical containing at least one additional carboxylic acid ester or anhydride group and usually containing about 3-10 carbon atoms. Any aliphatic or alicyclic radicals are preferably saturated. Thus, the suitable esters of formula I include those of aliphatic polycarboxylic acids such as succinic and citric acids, those of alicyclic polycarboxylic acids such as cyclo-hexane-1,2,4-tricarboxylic acid and those of aromatic acids such as isophthalic, terephthalic and trimellitic acids. Aromatic radicals are preferred.

Particularly preferred esters of formula I are those containing an internal anhydride moiety as part of $R^2$. These include, for example, esters of trimellitic anhydride having the formula wherein $R^1$ is as previously defined, with the methyl, ethyl and o-carbophenoxyphenyl esters being preferred.

The method of this invention also employs at least one triaryl phosphite as a catalyst. Illustrative phosphites are the triphenyl, tricresyl and tris(p-chlorophenyl) phosphites. Triphenyl phosphite is preferred by reason of its availability, low cost and particular suitability in the invention.

The method may be conducted at temperatures in the range of about 225°-350° C., preferably about 275°-325° C and in an inert atmosphere such as nitrogen or argon. Both melt and solution conditions may be employed, with solution conditions generally involving high boiling solvents and/or superatmospheric pressures. For the most part, however, it is preferred to employ melt conditions, using conventional processing methods such as extrusion.

The proportion of ester employed according to the invention is not critical and will depend on the degree of functionalization desired. In general, it is found that about 5-10% of ester by weight, based on polyphenylene ether, is adequate, with about 6-8% generally being preferred to effect carboxylation of about 50% of the polyphenylene ether. The triaryl phosphite is employed in catalytic amounts, generally about 0.5-2.0% by weight based on polyphenylene ether.

In copending, commonly owned U.S. patent application Ser. No. 28,857, filed Mar.23, 1987 there is disclosed a method of capping polyphenylene ethers by reaction with esters of salicylic acid. When $R^1$ in the compound of formula I is a salicylic acid ester group, said compound serves simultaneously as a carboxylating and capping agent, providing salicylate-capped polyphenylene ether which, under many conditions, is more stable than uncapped polyphenylene ether.

The invention is illustrated by the following examples. All parts and percentages are by weight. Percentages of capping agent and catalyst are based on polyphenylene ether.

EXAMPLE 1-4

Mixtures of 2 grams of a poly(2,6-dimethyl-1,4-phenylene ether) having a number average molecular weight in chloroform at 25° C. of 0.46 dl./g., 200 mg. of the 4-methyl ester of trimellitic anhydride and various amounts of triphenyl phosphite were dry blended and heated under nitrogen at 280±10° C. for about 3 minutes. The product was cooled, dissolved in hot toluene and precipitated by addition of a 4:1 (by volume) mixture of acetonitrile and acetone. The polymer was removed by filtration, washed with the acetonitrile-acetone mixture and vacuum dried at 80° C. overnight. The dried products were analyzed by Fourier transform infrared spectroscopy to determine the extent of carboxylation. The results are given in Table I.

TABLE I

| Example | Triphenyl phosphite, % | % carboxylation |
|---|---|---|
| 1 | 1 | 37 |
| 2 | 3 | 58 |
| 3 | 4 | 86 |
| 4 | 5 | 96 |

EXAMPLES 5–8

Mixtures of 412 grams of the polyphenylene ether of Examples 1–4 with various quantities of triphenyl phosphite and various 4-esters of trimellitic anhydride were dry blended in a Henschel mill and extruded at 170°–300° C. at 300 rpm. in a twin-screw extruder. The extrudates were quenched in water and pelletized. Samples of the pellets were dissolved in toluene, filtered, precipitated by addition of methanol and dried. They were then heated with a small amount of acetic anhydride to reconvert to anhydride any material which might have been esterified by methanol, and analyzed by Fourier transform infrared spectroscopy for percent carboxylation and, in Example 8, percent capping. In Example 6, the number average molecular weight of the polymer was also determined by gel permeation chromatography relative to polystyrene. The results are given in Table II.

TABLE II

| Example | Trimellitic anhydride ester Identity | % | Triphenyl phosphite, % | % carboxylation | % capping | Int. vis., dl./g. | Mn |
|---|---|---|---|---|---|---|---|
| 5 | Methyl | 8 | 1 | 54 | — | 0.57 | — |
| 6 | Methyl | 6 | 1 | 48 | — | 0.58 | 10,900 |
| 7 | Ethyl | 8 | 2 | 51 | — | 0.57 | — |
| 8 | o-Carbophenoxyphenyl | 6 | 0.5 | 40 | 55 | 0.60 | — |

EXAMPLE 9

A dry blend was prepared from 24.5 parts of the product of Example 5, 24.5 parts of the corresponding non-carboxylated polyphenylene ether, 41 parts of a commercially available polyamide-66 and 10 parts of a partially hydrogenated styrene-butadiene-styrene triblock copolymer having a styrene-butadiene ratio of 27:73 and a number average molecular weight of about 74,000. The blend was extruded on a twin screw extruder at 176°–288° C. and 300 rpm., pelletized, dried and injection molded into notched Izod test specimens which were then subjected to the Izod impact test (ASTM procedure D256), exhibiting an impact strength of 247 joules/m.

EXAMPLE 10

A sample of the product of Example 5 was dissolved in toluene and reprecipitated with methanol to remove residues derived from the carboxylating agent. Upon blending and molding as described in Example 9, there was produced a specimen having an impact strength of 292 joules/m.

EXAMPLE 11

Following the procedure of Examples 9–10, dry blends of 49 parts of the product of Example 5, 41 parts of nylon-66 and 10 parts of the triblock copolymer were extruded and molded into Izod test specimens, which had impact strengths of 265 and 318 joules/m., respectively, with and without reprecipitation.

What is claimed is:

1. A method for preparing a carboxy derivative of a polyphenylene ether which comprises contacting said polyphenylene ether at a temperature in the range of about 225°–350° C. with at least one ester of the formula

wherein $R^1$ is an alkyl or fluoroalkyl radical containing about 1–6 carbon atoms or an unsubstituted or substituted aryl radical containing about 6–10 carbon atoms and $R^2$ is an organic radical containing at least one additional carboxylic acid ester or anhydride group, in the presence of a catalytic amount of at least one triaryl phosphite.

2. A method according to claim 1 wherein the polyphenylene ether comprises a plurality of structural units having the formula

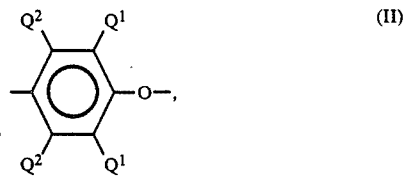

and in each of said units independently, each $Q^1$ is independently halogen, primary or secondary lower alkyl, phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$.

3. A method according to claim 2 wherein melt conditions are employed.

4. A method according to claim 3 wherein an inert atmosphere is employed.

5. A method according to claim 4 wherein about 5–10% by weight of said ester is employed, based on polyphenylene ether.

6. A method according to claim 5 wherein about 0.5–2.0% by weight of said triaryl phosphite is employed, based on polyphenylene ether.

7. A method according to claim 6 wherein the triaryl phosphite is triphenyl phosphite.

8. A method according to claim 6 wherein $R^2$ is an aromatic radical.

9. A method according to claim 8 wherein $R^2$ contains an internal anhydride moiety.

10. A method according to claim 9 wherein the ester has the formula

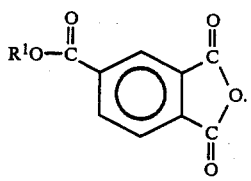
(VII)

11. A method according to claim 10 wherein $R^1$ is an alkyl radical or an aryl radical containing one or more electron-withdrawing substituents.

12. A method according to claim 11 wherein $R^1$ is methyl, ethyl or o-carbophenoxyphenyl.

13. A method according to claim 12 wherein the temperature is in the range of about 275°–325° C.

14. A method according to claim 13 wherein each $Q^1$ is methyl and each $Q^2$ is hydrogen.

15. A method according to claim 14 wherein the triaryl phosphite is triphenyl phosphite.

16. A method according to claim 15 wherein about 6–8% by weight of said ester is employed, based on polyphenylene ether.

17. A method according to claim 16 wherein $R^1$ is methyl.

18. A method according to claim 16 wherein $R^1$ is ethyl.

19. A method according to claim 16 wherein $R^1$ is o-carbophenoxyphenyl.

* * * * *